No. 647,655. Patented Apr. 17, 1900.
A. B. FLOYD.
COTTON PICKER.
(Application filed Apr. 24, 1899.)

(No Model.) 2 Sheets—Sheet 1.

Witnesses, A. B. Floyd, Inventor.
By his Attorneys,

THE NORRIS PETERS CO., PHOTO-LITHO., WASHINGTON, D. C.

No. 647,655. Patented Apr. 17, 1900.
A. B. FLOYD.
COTTON PICKER.
(Application filed Apr. 24, 1899.)
(No Model.) 2 Sheets—Sheet 2.
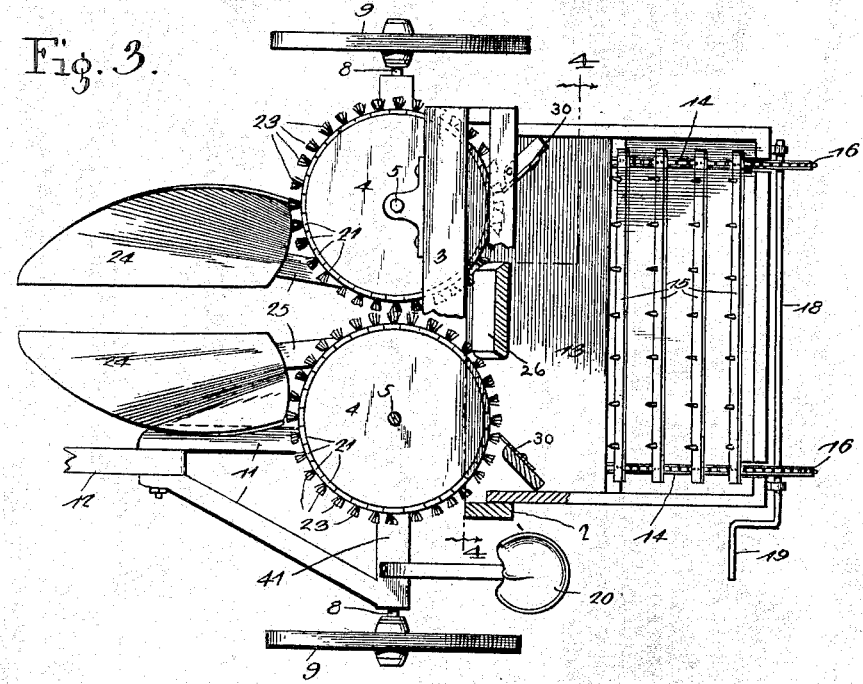
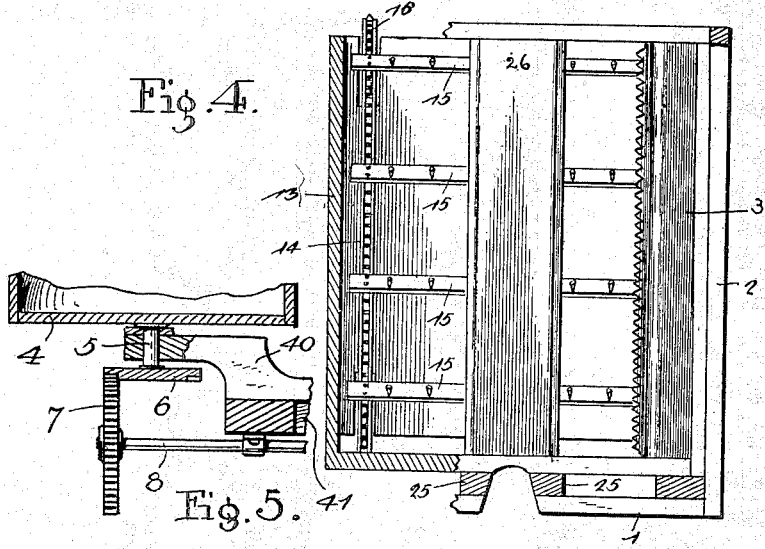
Witnesses, A. B. Floyd, Inventor.
By his Attorneys,

UNITED STATES PATENT OFFICE.

ALFRED B. FLOYD, OF HELENA, ARKANSAS.

COTTON-PICKER.

SPECIFICATION forming part of Letters Patent No. 647,655, dated April 17, 1900.

Application filed April 24, 1899. Serial No. 714,221. (No model.)

*To all whom it may concern:*

Be it known that I, ALFRED B. FLOYD, a citizen of the United States, residing at Helena, in the county of Phillips and State of Arkansas, have invented a new and useful Cotton-Picker, of which the following is a specification.

My invention relates to cotton harvesting and picking machinery, and has for its object to provide a simple and efficient construction and arrangement of parts whereby cotton may be effectually and rapidly removed from the bolls without injury to the stalks, the lower limbs or reclining stalks being raised into proper position as the picking-rolls approach the same.

Further objects and advantages of this invention will appear in the following description, and the novel features thereof will be particularly pointed out in the appended claim.

Figure 1:
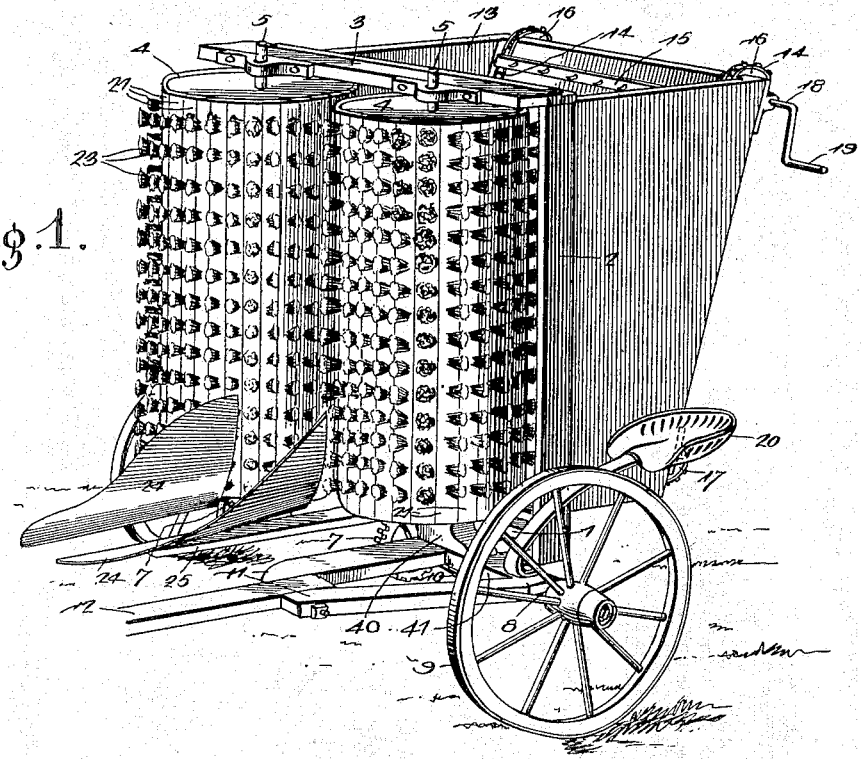
Figure 2:
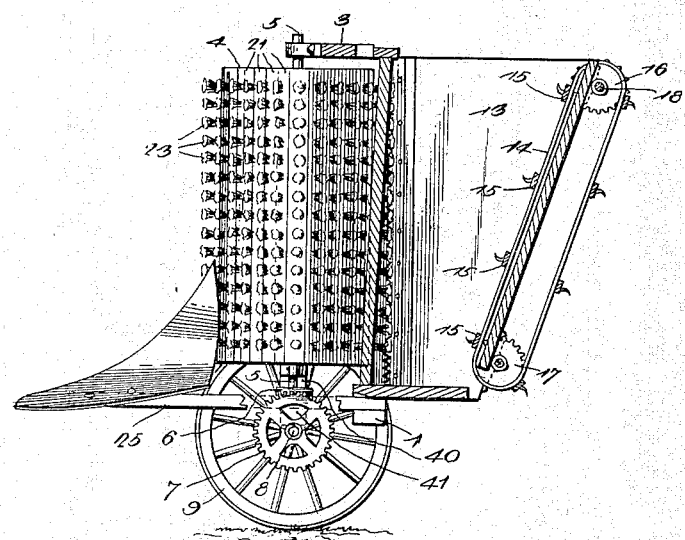

In the drawings, Figure 1 is a perspective view of a cotton-picking machine constructed in accordance with my invention. Fig. 2 is a longitudinal section. Fig. 3 is a plan view, partly in section. Fig. 4 is a transverse section. Fig. 5 is a detail view, partially in section and partially in elevation, and showing the lower bearings of the spindles.

Similar reference characters indicate corresponding parts in all the figures of the drawings.

The supporting-frame of the machine embodying my invention consists of a transverse bottom bar 1, side uprights 2, and a transverse upper or top bar 3, said bottom or base bar having a central arch cut therethrough to form a passage through which the stalks may pass. The picking rolls or drums 4 are provided with spindles 5, mounted in bearings, of which the upper bearings are carried by the top frame-bar and the lower bearings are mounted in blocks 40, carried by the axletrees 41, and at their lower ends said spindles are provided with pinions 6, with which mesh gears 7, carried by spindles 8 of the ground-wheels 9, said spindles being mounted in bearings 10. (Shown in Fig. 5 of the drawings.) The draft appliances consist of a frame comprising hounds 11, which extend forward from the main frame at one side, and a tongue 12 or the equivalent thereof mounted upon the hounds.

Supported by the main frame and extending rearwardly therefrom is a hopper 13 for the reception of the cotton carried thereinto by the picking rolls or drums, and in operative relation with the rear inclined wall of the hopper is an endless carrier consisting of carrier-chains 14, connected by spurred slats 15 and traversing chain-wheels 16 and 17, the upper chain-wheel 16 being carried by a common shaft 18, provided with a terminal crank-arm 19, which is within reach of the occupant of the driver's seat 20, supported by the draft-frame.

Each picking roll or drum preferably consists of terminal heads or disks connected by vertical slats 21, and each slat carries a longitudinal series of wire brushes 23 for removing cotton from the bolls and carrying it rearwardly into the receptacle or hopper. Also arranged in operative relation with the picking rolls or drums are combs 30, disposed vertically in the hopper or receptacle in the paths of the brushes. Said combs are disposed to diverge rearwardly and serve to deflect the cotton toward the carrier.

For the purpose of raising fallen stalks and also raising the lower limbs of upright stalks to cause them to pass between the picking rolls or drums in position for the proper and expeditious removal of the cotton I employ forwardly-extending deflectors 24, arranged, respectively, in front of the rolls or drums, supported by forwardly-divergent arms 25 and having forwardly-divergent inner edges. The front ends of these deflectors, which consist of plates, operate close to the surface of the ground, and the plates curve upward toward their outer side edges to gradually lift the branches as the deflectors pass thereunder, whereby the stalks are presented to the picking-rolls in a proper upright position. In the construction illustrated each deflector consists of an approximately-triangular plate, of which one angle is forwardly disposed to pass under the branches of the stalks and of which the edge opposite to said forward angle is arranged adjacent to one of the picking-rolls. Furthermore, disposed vertically at the center of the main frame, and hence opposite the interval between the picking-rolls, is a guard-bar 26, which prevents the upper portions of stalks from springing into the receptacle or hopper after the rolls have passed the same.

Various changes in the form, proportion, size, and minor details of construction within the scope of the appended claim may be resorted to without departing from the spirit or sacrificing any of the advantages of the invention.

Having described my invention, what I claim is—

In a cotton-picker, the combination of an upright main frame, and supporting devices including ground-wheels, a hopper supported by said main frame and extending rearwardly therefrom, axially-vertical picking rolls or drums mounted in bearings upon the main frame in front of and extending into the receptacle or hopper and provided with picking-brushes, said rolls or drums being geared for operation to the ground-wheels, rearwardly-diverging combs arranged in the hopper in operative relation with the brushes and adapted to receive and deliver material from the entire periphery of their respective rollers, a vertical guard-bar arranged centrally of the main frame, opposite the interval between the adjacent sides of the picking-rolls, and a vertically-movable endless carrier mounted in the receptacle, and adapted to receive material direct from the combs throughout the height of the hopper and provided with means whereby it may be manually actuated to remove the contents of the receptacle, substantially as specified.

In testimony that I claim the foregoing as my own I have hereto affixed my signature in the presence of two witnesses.

ALFRED B. FLOYD.

Witnesses:
F. F. KITCHENS,
C. R. SANDERS.